United States Patent
Brace et al.

[15] 3,661,740
[45] May 9, 1972

[54] RECOVERY OF COPPER FROM COPPER ORES

[72] Inventors: Eldred C. Brace; George E. Green, both of Tucson, Ariz.

[73] Assignee: Banner Mining Company, Tuscon, Ariz.

[22] Filed: July 13, 1967

[21] Appl. No.: 653,158

[52] U.S. Cl. ..................204/96, 75/101 R, 75/117, 204/106
[51] Int. Cl. ..........................................C22d 1/16
[58] Field of Search...............75/117, 101 R; 23/55, 247; 204/106, 96

[56] References Cited

UNITED STATES PATENTS 2,970,096  1/1961  Horton.................................75/117 X
3,148,130  9/1964  Brace et al............................204/96
3,463,710  8/1969  Lower...................................204/106

Primary Examiner—L. Dewayne Rutledge
Assistant Examiner—G. T. Ozaki
Attorney—Allan D. Mockabee

[57] ABSTRACT

A method of recovering of oxidized copper from limestone gangue ores in which finely ground ore is leached with a caustic solution with gentle agitation and heat in stages, pregnant caustic solution from a succeeding stage being used to leach ore in a preceding stage; the ore in the final stage is leached with a copper barren caustic solution with gentle agitation and heat; copper sponge produced from the pregnant caustic solution by electrolysis, and the resulting copper barren caustic returned for re-use. Lime is used to recausticize dilute caustic from the final wash of the solids, and the thus recausticized solution is concentrated and also returned for re-use.

9 Claims, 1 Drawing Figure

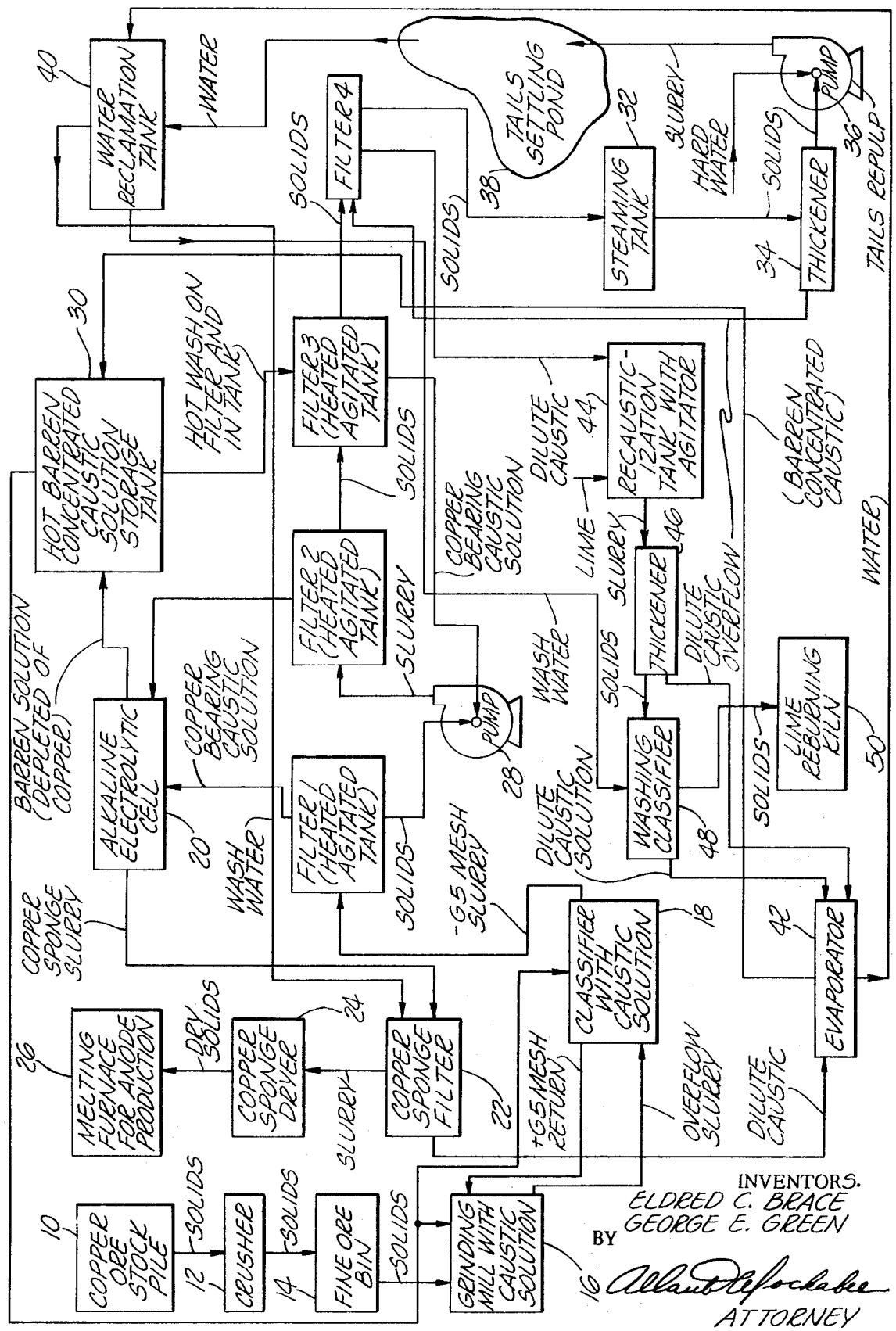

3,661,740

RECOVERY OF COPPER FROM COPPER ORES

RELATED PATENTS

The present invention is an improvement upon U.S. Pat. No. 3,148,130, issued Sept. 8, 1964 to Brace and Horton.

A large amount of oxidized copper ore is found in the area adjacent to Tucson, Arizona, containing substantial amounts of calcium and/or magnesium carbonates which render the ore unsuitable for acid leaching.

The invention relates to a method of recovering oxidized copper from carbonates such as limestone with a caustic such as sodium hydroxide wherein finely ground ore is gently agitated in the caustic solution under heat for short periods of time, preferably in several stages, the method being such that a high percentage of copper is recovered, the copper is prevented from being adsorbed or re-precipitated on the solids and recovery is accomplished in a short time.

The invention has as another object the efficient re-use of the caustic, making the method economically practical for the recovery of copper from relatively low-grade ores.

A further object of the invention is to treat the ore in several stages, for example, three stages, wherein hot copper-barren caustic solution is used in the third stage to recover as much copper as possible from the ore which has passed through two preceding stages, and to utilize the less copper pregnant solution from the third stage as the caustic leaching solution in the second stage.

Another object of the invention is to provide a copper recovery method in which the ore is ground to approximately −65 mesh particle size, and to leach it with a hot strong caustic solution with gentle agitation in, for example, three stages, for periods of 10 to 30 minutes each to obtain maximum extraction in a minimum time.

Another object is to provide a method of the type referred to wherein the copper is leached with hot sodium hydroxide and the sodium cuprate obtained is separated in an electrolytic cell in the form of copper sponge. The remaining solids are successively leached and washed with a hot concentrated caustic solution blended with a previously used weaker caustic solution which has been recausticized with lime. The copper barren dilute caustic solution is concentrated by evaporation and returned to the original caustic supply. The precipitated limestone is recovered for re-use.

The above and other objects will more fully appear from the following description in connection with the accompanying drawing:

The drawing is a flowsheet of apparatus illustrated diagrammatically and suitably captioned for carrying out the method.

Copper ore from the stockpile 10 is run through a crusher 12 to a fine ore bin 14 and thence to a grinding mill 16. Barren caustic solution is conducted from storage tank 30 to the grinding mill and the ore is ground to a fineness of approximately −65 mesh. The slurry from the grinding mill is conducted to a classifier 18 which, as indicated, returns the +65 particles for regrinding in the mill 16. Additional barren caustic solution is added to the classifier 18, the −65 mesh particles and pregnant caustic slurry are fed to filter 1, and the slurry is subjected to gentle agitation under heat in the neighborhood of 180° to 200° F. for a period of 10 to 30 minutes. This initial leaching of the ore removes a fairly high percentage (approximately 65 percent) of the copper. The clarified copper pregnant caustic solution is conducted to an alkaline electrolytic cell 20.

The electrolytic cell 20 separates copper in the form of a sponge slurry as disclosed in the above referenced U.S. Pat. No. 3,148,130 which is conducted from said cell 20 to a copper sponge wash filter 22, then to a copper sponge dryer 24 and from there to a melting furnace 26 where copper anodes are produced.

The solids from filter 1 are conducted to a pump 28 to which pregnant caustic solution is fed from filter 3. The mixture of pregnant caustic solution from filter 3 and solids from filter 1 is conveyed from pump 28 in the form of a slurry to filter 2. There the slurry is heated to 180° to 200° F. and gently agitated for a period of 10 to 30 minutes. The solids from filter 2 are conducted to filter 3. Pregnant caustic solution resulting from the leaching action in filter 2 is conducted to the alkaline electrolytic cell 20. Approximately an additional 25 percent of the originally available copper is extracted in filter 2.

Filter 3 is supplied with hot copper-barren caustic solution from a storage tank 30. Sodium hydroxide is used as a solvent because of its relatively low price and its efficient leaching action. The caustic tank 30 is supplied with barren caustic solution separated from the copper in the electrolytic cell 20 and also from a source to be described below.

In filter 3 the slurry is gently agitated and heated to 180° to 200° F. to further leach the ore particles. In filter 3 approximately 5 to 10 percent additional extraction of the originally available copper can be made. The filter cake on filter 3 is washed with hot strong barren caustic solution so that the copper contained in voids can be washed out of the cake without caustic dilution that might cause reprecipitation of copper. The sodium hydroxide solution with the above-mentioned 5 to 10 percent of the copper is conducted to the pump 28 and it, with the solids from filter 1, provide the slurry for filter 2. The solids from filter 3 are conducted to filter 4 where they are washed with hot water.

When using strong sodium hydroxide solutions for leaching the ores, Pirssonnite $Na_2CO_3 \cdot CaCO_3 \cdot 2H_2O$ and Gay-lussite, $Na_2CO_3 \cdot CaCO_3 \cdot 5H_2O$ are formed as double salts on the particles. This remains on the residual particles. These double salts disassociate when solutions are diluted and when live steam is applied to the surface of the solids. Since insoluble calcium hydroxide is also intimately present, the steam will decompose any film on the solids, and additional sodium hydroxide will e formed by chemical reaction when the tailings are thus steamed and hot water washed. The chemical reaction between the calcium hydroxide and the sodium carbonate present results in the formation of the additional sodium hydroxide which can be used for the leaching.

The solids are steamed in the tank 32 and are thickened in a thickener 34. Dilute caustic is removed from the thickener 34 and re-used in filter 4. The solids from the thickener 34 are mixed with available unsoftened water in a pump 36 and conducted to a tails settling pond 38. Water is removed from the pond and reclaimed in a reclamation tank 40. Water from the tailings pond 38 is relatively soft, and a percentage thereof is conducted from the reclamation tank 40 to the copper sponge filter 22 to wash the sponge. From the sponge filter 22 this water is slightly caustic due to a residue of sodium hydroxide removed from the sponge. This slightly alkaline solution is conducted to an evaporator 42. The water removed during evaporation is returned to the reclamation tank 40. From the evaporator the concentrated barren caustic solution storage tank 30.

The filtrate from filter 4 is conducted to a recausticization tank 44 where it is mixed with lime and agitated for 1 hour at 180° – 200° F. thus converting sodium carbonate to sodium hydroxide and calcium carbonate. We have discovered that sodium carbonate and sodium silicates produced during this leaching process can be converted back to sodium hydroxide with a residue of calcium carbonate. In this method we established maximum concentration of sodium hydroxide in solution and sodium carbonate in solution whereby upon the addition of lime the stoichiometric quantities of sodium carbonate is converted to sodium hydroxide. In addition, if sodium silicates are present in the leach solution, the addition of lime converts the silicates into sodium hydroxide and an insoluble by-product of calcium silicate precipitates and remains as a residue. We have found that the ratio between sodium hydroxide and sodium carbonate contained in a dilute solution should be of the order of 3 parts sodium hydroxide to 1 part sodium carbonate. A preferred ratio to maintain in a dilute solution during practice is a maximum of 120 grams sodium hydroxide to 30 grams sodium carbonate per liter and a minimum of 30 grams sodium hydroxide per liter to 10 grams sodium carbonate per liter.

The sodium hydroxide produced by this method of recaustisization of the sodium carbonate with lime is only possible due to the by-products sodium carbonate and sodium silicate present as a result of the reaction of sodium hydroxide with silicates and carbonates in the ores.

It is well-known that the soda-lime process for producing sodium hydroxide has existed for a great number of years. However, in the old well-known process they do not have arbitrary amounts and proportions of by-products present for producing sodium hydroxide. In our process we produce the by-products sodium carbonate and sodium silicate from reaction of sodium hydroxide leaching solution with calcium carbonate and various silicates in the ores. In so doing, we have discovered that in order to attain complete reconversion of the carbonates and silicates to sodium hydroxide, the aforementioned ratios are mandatory. The slurry from the recausticization tank 44 is carried to a thickener 46. The dilute caustic overflow is fed to the evaporator 42. The concentrated caustic produced is also returned to the hot barren caustic solution storage tank 30. Solids from the thickener are conducted to a wash classifier 48 which receives soft water from the water reclamation tank 40. Overflow from the the classifier 48 is a dilute caustic solution which, as shown, is conducted from the evaporator 42 for concentration and then returned to the hot barren caustic solution storage tank 30. Solids removed from the washing classifier 48 are calcined in kiln 50 to recover the lime from the calcium carbonate for re-use in the recausticizing tank 44.

The method described above will prevent the precipitation of copper from the solutions in the form of cupric oxide which is sparingly soluble in sodium hydroxide. We have discovered that reprecipitation of cupric oxide from leach solutions can be prevented by leaching the residual solids with strong hot sodium hydroxide with very little copper in the leach solution. Caustic strength should not be less than 160 gms NaOH per liter during this step. We have found that as a strong sodium hydroxide solution containing copper in the form of sodium cuprate is diluted, appreciable quantities of cupric oxide are reprecipitated. This is due to the fact that the solubility of sodium cuprate is a function of concentration of the solvent, sodium hydroxide. The decrease in concentration of the copper in this solution enables the sodium hydroxide to hold all copper present in the solution and prevent the reprecipitation of cupric oxide upon subsequent water-washing to remove sodium hydroxide solution from the solids.

One of the principal features of the invention is that it makes possible the rapid leaching of finely divided oxidized copper ores which have been pre-ground to a fineness of approximately −65 to −48 mesh, preferably −65 mesh. If the ore is too fine, it will increase the time required for filtration. Heretofore, during normal leaching procedures a certain amount of cupric oxide unavoidably reprecipitates before complete extraction of all the copper from the ore is accomplished. This can be prevented by changing the leach solution during the leaching. As pointed out above, the finely ground ore is leached for from 10 to 30 minutes with a hot strong sodium hydroxide solution accompanied by heat and gentle agitation to speed up the leaching. During the first treatment, approximately 65 percent of the available copper is extracted and the pregnant solution is drawn off. The residual pulp resulting from filtration in filter 1 is leached for a second period of 10 to 30 minutes with another supply of strong hot sodium hydroxide solution. During this second leach period, approximately 25 percent of the remaining copper is extracted. Also, during the third leaching treatment in filter 3 for 10 to 30 minutes with a strong hot, substantially copper barren sodium hydroxide leach solution, an additional 5 to 10 percent extraction of copper is secured.

With some ores, acceptable extraction of copper can be attained without resorting to the third treatment. However, if it is desired to attain the highest possible copper concentration in the solution after the leaching, we have found it better to utilize the third leach in filter 3, and introduce the pregnant solution from the third filter or stage to the second. Thus, it is leaching of the ore with hot concentrated caustic such as sodium hydroxide and gentle agitation for short period of time in two and preferably three stages and to utilize a hot copper-barren caustic on the third stage and conduct it from the third stage with a low percentage of copper to the second stage where a high copper concentration is secured and then conducted to the electrolytic cell, which procedure results in maximum extraction efficiency.

In the practice of the method we have found that in the sodium hydroxide leaching of oxidized copper ores in limestone gangue ($CaCO_3$), when the concentration of sodium carbonate, produced by the reaction of sodium hydroxide with calcium carbonate, is permitted to approach saturation in hot sodium hydroxide solution, the leaching action of the sodium hydroxide on the oxidized copper is enhanced. The concentration of sodium hydroxide in the leach solution remains more constant and improves extraction efficiency with less ultimate consumption of sodium hydroxide. Further, with a heated sodium hydroxide solution that is saturated with sodium carbonate, the sodium hydroxide has a more preferential action on the copper mineral than on the calcium carbonate gangue.

To make the method economically practical, we have disclosed steps wherein the caustic solution is recovered not only from the electrolytic cell 20, but also from the evaporator 42 and from the thickening tank 34 which latter receives the solids from the steaming or washing tank 32. In addition the dilute caustic from filter 4, a wash filter, is recausticized with lime before it is fed to the evaporator 42. The lime used in recausticization is recovered from the classifier 48 and reburned in the kiln 50 for re-use in the recausticization step.

Where soft water is in short supply as in the mining areas in the neighborhood of Tucson, Arizona, and other areas, the hard water available is fortunately softened in the tails settling pond by zeolites in the solids and the supernatant soft water is used to wash the copper sponge on filter 22 and in the washing classifier 48.

Primarily this sodium hydroxide leaching process is adaptable to oxidized copper ores contained in a limestone gangue. However, the process can also be used for leaching oxidized copper ores contained in a siliceous gangue if the use of acids is not imperative for such ores. When either limestone gangue or siliceous gangue ores are leached with sodium hydroxide, sodium cuprate is obtained as the ultimate reaction producer.

It should be understood that changes can be made in the details of the method without departing from the spirit of the invention.

We claim:

1. A method of recovering copper from finely divided oxidized copper ores wherein the improvement comprises: leaching oxidized copper ore present in a limestone gangue, that is ground to approximately −65 mesh particles size using a hot strong aqueous sodium hydroxide copper solvent solution in each of three steps of 10 to 30 minute time intervals, the solution having a sodium hydroxide concentration of not less than 160 grams per liter and the temperature being in the neighborhood of 180° to 200° F., thereby obtaining a maximum extraction of copper as sodium cuprate and recovering the copper from solution by electrolysis.

2. A method of recovering copper from copper ores by caustic leaching, the ores having been crushed and ground and then leached in a strong sodium hydroxide solution, wherein the improvement comprises; subjecting the ores to three separate leachings with a different leach solution, removing the ore solids from the solution, washing the solids with a hot aqueous solution containing a minimum of approximately 160 grams of sodium hydroxide per liter at a temperature in the neighborhood of 180° to 200° F., which results in removal of copper from the voids between the solid particles but does not dilute the sodium hydroxide solution sufficiently to allow reprecipitation of copper previously extracted by leaching of the copper ores, and recovering the copper from the solution by electrolysis.

3. A method of recovering copper from finely divided oxidized copper ores by leaching with a sodium hydroxide solution wherein the improvement comprises: in a first step, treating previously untreated ore with a low copper pregnant aqueous solution having a sodium hydroxide concentration of not less than 160 grams per liter to remove and put into the solution a percentage of the copper from the ore to produce a high copper pregnant sodium hydroxide solution, removing the high copper solution resulting from said first stage, separating the copper therefrom; in a second stage, treating the solids from the first stage with another supply of said aqueous sodium hydroxide solution to remove a further percentage of the copper from the ore and produce a lower copper pregnant sodium hydroxide solution than that produced in the first stage, withdrawing the lower copper solution from the second stage; and in a third stage, treating the solids from the second stage with another supply of sodium hydroxide solution and separating the copper therefrom, and recovering the copper from said solutions by electrolysis.

4. The method of claim 3, and in the third stage, subjecting the solids from the second stage with an aqueous barren sodium hydroxide solution of the same concentration to remove a further percentage of copper from the solids.

5. The method of claim 3, and in the third stage, subjecting the solids from the second stage to agitation with an aqueous barren sodium hydroxide solution to remove a further percentage of copper from said solids and produce a lower copper pregnant sodium hydroxide solution and separating and returning said last mentioned lower copper pregnant sodium hydroxide solution from the third stage to the previously treated solids of the second stage for the second stage treatment.

6. The method of claim 3, and concentrating the sodium hydroxide solution from which the copper has been removed and returning it for reuse in said third stage.

7. A method of recovering copper from the finely divided oxidized ores from a grinding mill wherein the ores are leached with a sodium hydroxide solution to remove the copper, wherein the improvement comprises: in a first stage, treating the ore with an aqueous sodium hydroxide solution having a sodium hydroxide concentration of a minimum of 160 grams per liter to dissolve at least part of the copper in the solution; in a second stage, treating the solids from the first stage with another supply of sodium hydroxide solution to remove additional copper from said solids, separating the pregnant sodium hydroxide solution from the solids, and, after the final treatment of the solids with the sodium hydroxide solution, introducing said solution into said grinding mill with a fresh supply of ore, and introducing the ground ore and sodium hydroxide solution from the grinding mill to said first stage, the sodium hydroxide solution having first been subjected to electrolysis to recover the copper therefrom.

8. The method of claim 7, and removing the pregnant sodium hydroxide solution from the first stage, and separating the copper therefrom by electrolysis and returning the then barren sodium hydroxide solution to the grinding mill with its fresh supply of ore.

9. The method of recovering copper from copper carbonate ores which are crushed, ground and leached in a solvent and the copper recovered from the solvent, wherein the improvement comprises: in a first stage, agitating the finely divided copper carbonate ores in a concentrated aqueous solution having a 160 grams per liter minimum concentration of sodium hydroxide for a period of 10 to 30 minutes, the sodium hydroxide solution being heated to a temperature of between approximately 180° to 200° F., removing the pregnant solution therefrom; in a second stage, agitating the slurry from the first stage in a similar sodium hydroxide solution for a period of 10 to 30 minutes; in a third stage, agitating the slurry from the second stage in a sodium hydroxide solution other than that used in the second stage, separating the pregnant solution therefrom, and recovering the copper from the pregnant sodium hydroxide solutions of said stages by electrolysis.

* * * * *